(12) United States Patent
Kim et al.

(10) Patent No.: US 9,459,672 B2
(45) Date of Patent: Oct. 4, 2016

(54) CAPACITANCE MANAGEMENT

(71) Applicant: International Business Machines Corporation, Armonk, NY (US)

(72) Inventors: Kyu-hyoun Kim, Mount Kisco, NY (US); Anil B. Lingambudi, Bangalore (IN); Diyanesh B. Vidyapoornachary, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 635 days.

(21) Appl. No.: 13/929,896

(22) Filed: Jun. 28, 2013

(65) Prior Publication Data
US 2015/0001961 A1    Jan. 1, 2015

(51) Int. Cl.
*H02M 3/08*   (2006.01)
*G06F 1/26*   (2006.01)

(52) U.S. Cl.
CPC ...................... *G06F 1/26* (2013.01)

(58) Field of Classification Search
CPC ....................................................... G06F 1/26
USPC ......................................................... 307/109
See application file for complete search history.

(56) References Cited

U.S. PATENT DOCUMENTS

| | | |
|---|---|---|
| 6,732,263 B1 | 5/2004 | May et al. |
| 6,967,416 B2 | 11/2005 | Clevenger et al. |
| 7,667,487 B2 | 2/2010 | Bartley et al. |
| 8,369,963 B2 | 2/2013 | Parramon et al. |
| 2004/0123119 A1 | 6/2004 | Buer et al. |
| 2005/0281114 A1* | 12/2005 | Choi .................. G11C 5/147 365/226 |
| 2012/0008443 A1* | 1/2012 | Hebig .................. G11C 7/02 365/203 |
| 2013/0027122 A1 | 1/2013 | Lin et al. |

OTHER PUBLICATIONS

Bitirgen et al., "Coordinated Management of Multiple Interacting Resources in Chip Multiprocessors: A Machine Learning Approach", MICRO 41: Proceedings of the 41st Annual IEEE/ACM International Symposium on Microarchitecture, 2008. DOI: 10.1109/MICRO.2008.4771801.

Chen et al., "Predictive Coordination of Multiple On-Chip Resources for Chip Multiprocessors", ICS '11: Proceedings of the International Conference on Supercomputing, May 2011, pp. 192-201, ACM New York, NY, © 2011. DOI: 10.1145/1995896.1995927.

(Continued)

*Primary Examiner* — Jared Fureman
*Assistant Examiner* — Duc M Pham
(74) *Attorney, Agent, or Firm* — Wood, Herron & Evans, LLP; Robert R. Williams

(57) ABSTRACT

A system and method are provided for sharing capacitance. The system may include a first electronic entity with a capacitor having capacitance. The system may further include a switched path in the first electronic entity. The switched path may have a first switched position in which the switched path provides the capacitance to a voltage using device in first electronic entity. The switched path may also have a second switched position in which the switched path provides the capacitance to a second electronic entity. The switched path may also have a third switched position in which the switched path provides the capacitance to both the voltage-using device in the first electronic entity and the second electronic entity.

13 Claims, 3 Drawing Sheets

(56) References Cited

OTHER PUBLICATIONS

Kong et al., "Atomic Streaming: A Framework of On-Chip Data Supply System for Task-Parallel MPSoCs", IEEE Computer Architecture Letters, vol. 11, No. 1, Jan.-Jun. 2012, pp. 5-8, © 2011 IEEE Computer Society, (Posted to IEEE and CSDL Sep. 9, 2011). DOI: 10.1109/L-CA.2011.21.

Spracklen et al., "Chip Multithreading: Opportunities and Challenges", HPCA-11: Proceedings of the 11th International Symposium on High-Performance Computing, 2005. DOI: 10.1109/HPCA.2005.10.

* cited by examiner

CAPACITANCE MANAGEMENT

TECHNICAL FIELD

This disclosure generally relates to resource sharing between electronic devices, and in particular, to sharing of capacitance between electronic devices.

BACKGROUND

Modern computer systems have a growing demand for greater processing power and capabilities. To meet this demand the computer systems may have an increased number of chips. Chips may consist of voltage using devices and support systems for those voltage using devices. A common support system on a chip is a capacitor. On chips capacitors may be used to manage the power supply noise to a voltage using device on the chip. The capacitors may be an effective way to reduce the impedance of power delivery systems operating at high frequencies. One or more capacitors on the chip may acts as local reservoirs of charge, which is released when the power supply voltage at a particular current load drops below some tolerable level. The use of capacitors may significantly affect the design of the power/ground (P/G) networks in high performance integrated circuits (ICs) in chips, such as microprocessors. With the increased demand in the number of chips in computer systems the space, distribution, and cost of support systems, such as capacitors, on chips demand innovative solutions.

SUMMARY

A system and method storage media are provided for sharing capacitance. The system may include a first electronic entity with a capacitor having capacitance. The system may further include a switched path in the first electronic entity. The switched path may have a first switched position in which the switched path provides the capacitance to a voltage using device in first electronic entity. The switched path may also have a second switched position in which the switched path provides the capacitance to a second electronic entity. The switched path may also have a third switched position in which the switched path provides the capacitance to both the voltage-using device in the first electronic entity and the second electronic entity.

In another embodiment, a method for sharing capacitance may include detecting switch setting signal at first electronic entity with a capacitor. The method may further include, switching a switched path in the first electronic entity to a specified switched position based upon the switch setting signal. In a first switched position, the switched path may provide capacitance to a voltage using device in the first electronic entity. In a second switched position, the switched path may provide capacitance to a second electronic entity. In a third switched position, the switched path may provide capacitance to both the voltage using device in the first electronic entity and the second electronic entity.

BRIEF DESCRIPTION OF THE DRAWINGS

Embodiments are illustrated by way of example, and not by way of limitation, in the figures of the accompanying drawings in which like reference numerals refer to similar elements or steps.

DETAILED DESCRIPTION

In computer systems there is a demand for growing chip density. These chips often have voltage using devices and support systems for those voltage using devices. A common support system on a chip is a capacitor. As the demand for more chips in systems increase the demand for more support systems, such as the capacitors grows. The demand for the capacitors may also be driven by the increase in variety of capacitance the voltage using devices on the chip may require. Examples of voltage using devices on the first electronic entity may include, but are not limited to, a memory, a CPU core, or ED RAM. The increase in capacitance demand may results in not just more capacitors due to more chips, but also more capacitors per chip or system to meet the varied capacitance demand. This demand for a variety and number of capacitors may result in greater demands on space or cost of the system effectively limiting the number of chips counts inside a package. Ensuring required level and variety of capacitance per chip is essential for basic operation within target specifications. With next generation server system demands for increased speed and memory capacity real estate in packages and systems needs to be carefully designed. In various embodiments, the presented invention may facilitate or enable higher chip integration thus enabling resource sharing of capacitance between chips to assist power distribution and possible reduce the use of real estate space in packages or systems for capacitance systems.

In various embodiments, the presented invention for sharing capacitance may include a first electronic entity, such as a first chip, with a capacitor that has a switched path within it. The switched path may consist of one or more switches that in various switched positions enable the first chip to direct the capacitance from the capacitor in a variety of ways. For example, in a first switched position the switched path may provide capacitance to a voltage using device in the first chip. In a second switched position the same switched path may provide capacitance to a second chip. While in a third switched position, the switched path may provide capacitance to both the voltage using device in the first chip and to the second chip. The switched paths various switched positions and ability to share capacitance may allow the chips a wider variety of capacitance while reducing the overall need and space for capacitors to the system.

Figure 1A:
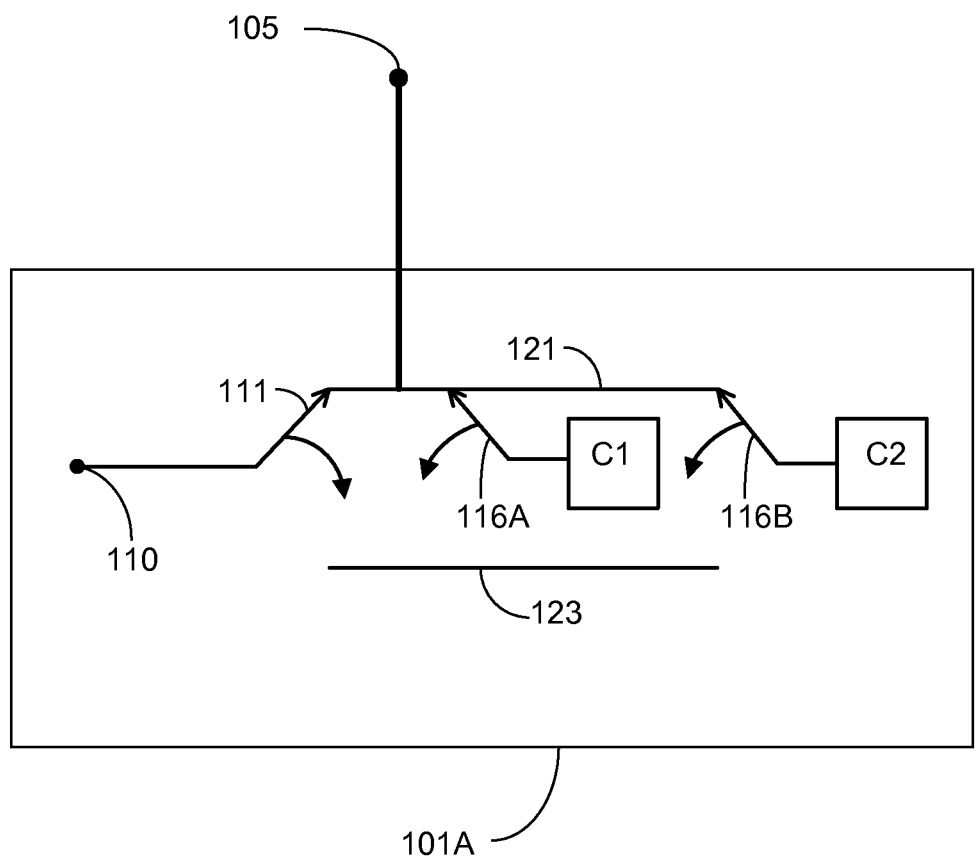
FIG. 1A depicts a high-level block diagram of an exemplary electronic entity, a chip, for implementing an embodiment of the invention.
Figure 1B:
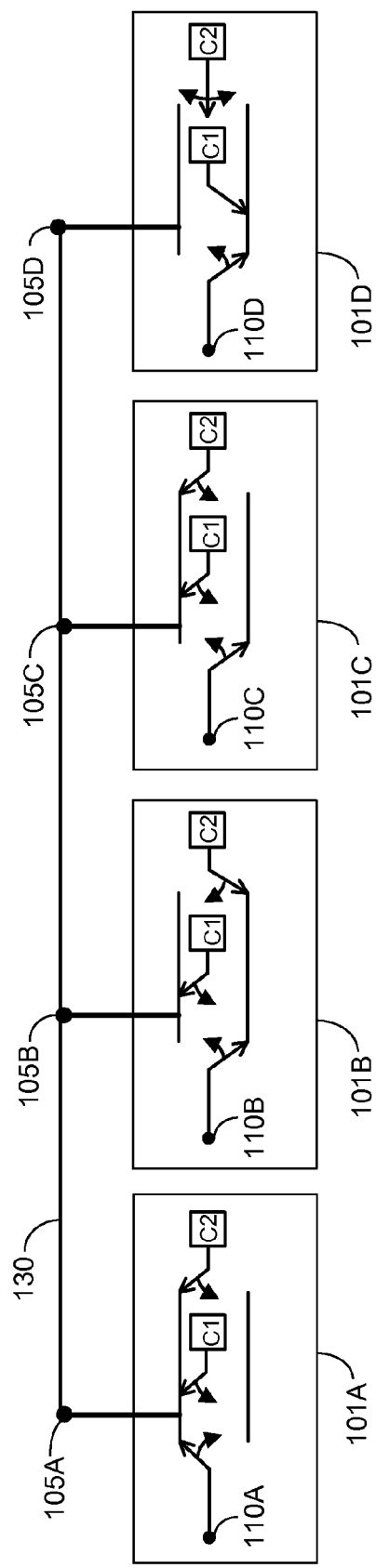
FIG. 1B depicts a high-level block diagram of an exemplary group of electronic entities, for implementing an embodiment of the invention.

FIGS. 1A and 1B depict high-level block diagrams of exemplary systems for implementing an embodiment of the invention. FIG. 1A depicts a high-level block diagram of an exemplary electronic entity, a chip, for implementing an embodiment of the switched path disclosed for sharing capacitance. FIG. 1B depicts a high-level block diagram of an exemplary group of electronic entities, a multitude of the chip shown in FIG. 1A, for implementing an embodiment of the switched path for sharing capacitance.

FIG. 1A depicts a high-level block diagram of an exemplary electronic entity, a chip 101A, for implementing an embodiment of the switched path disclosed for sharing capacitance. In an embodiment, the chip 101A consists of a voltage using device 110, first and second capacitors C1 and C2 respectively each having some capacitive value, paths 121 and 123, and switches 111, 116A, and 116B. The embodied chip also includes an external path 105 as part of the switched path. The embodiment provides an example of how electronic entity may have multiple capacitors, switches, and paths creating the switched path of the invention. In other embodiment, the number of capacitors, voltage using devices, paths, or external paths may vary in number, location, or alignment. The switches 111, 116A, and 116B may be transistors in various embodiments.

In the embodiment presented, the switched path includes switches 111, 116A, and 116B. Each switch 111, 116A and 116B may have 3 settings. The first position may be contact with first path 121. First path 121 is illustrated as being connected to external path 105, and may be used to provide or share capacitance between chip 101A and a second electronic entity. The second setting for each switch 111, 116A, and 116B may be contact with second path 123. Second path 123 may be used for capacitance not meant to be shared with the second electronic entity. The second path 123 may be used when the voltage using device 110 is receiving capacitance from either or both capacitors C1 or C2. The third setting for each switch 111, 116A, and 116B would be a neutral position contacting neither first path 121 nor second path 123. The switches may be set independently of each other and the combination of switch setting relative to the paths creates the switched position possible for the switchable path.

In the embodiment presented, the switched path is in the third switched position. Capacitance from the first and second capacitors C1-C2 may be shared with both voltage using device 110 on the first electronic entity and with a second electronic device. This is possible due to switches 111, 116A, and 116B all contacting path 121. This results in a path from the first and second capacitors C1-C2 to both the voltage using device 110 and to the external path 105. Below other switched positions are discussed along with the sending of capacitance to a second electronic entity.

FIG. 1B depicts a high-level block diagram of an exemplary group of electronic entities, a multitude of chip 101A shown in FIG. 1A, for implementing an embodiment of the switched path for sharing capacitance. The example illustrates how the electronic entities can be either a first or second electronic entity based upon the switched position of the switched path in each. For the ease of explanation in the example, each chip 101A-101D, the first chip through fourth chip respectively, is equivalent in elements and internal components with only the switched position of the switched path being different in each. For example, the value of C1 and C2 capacitance are equivalent in each respective chip 101A-101D may be equivalent in output. The external path 105A through 105D respectively are connected by a connecting path 130 that allows transmission of capacitance between the chips 101A-101D.

In the embodiment presented, the fourth chip 101D is an example of the first switched position for the switched path. The switched path provides only for the capacitor capacitance to be provided to the voltage using device on the chip. As shown, the voltage using device receives the capacitance from C1 only, with the C2 capacitance remaining unused as the switch for it is in a neutral position. The switched position for the switched path provides for no capacitance to be directed to a second chip.

In the embodiment presented, the third chip 101C is an example of the second switched position for the switched path. The switched path provides only for the capacitor capacitance to be provided to the second electronic entity. As shown, the capacitance of both C1 and C2 of the third chip 101C are direct to the external path 105C. This may allow the capacitance of third chip 101C to be shared with a second electronic entity. In this example, the second electronic entity would be first chip 101A. This is because, of all the connected electronic entities, first through fourth chips, 101A-101D respectively, connected by connecting path 205 it is the only one with switched path in a switched position to allow a voltage using device 110A to receive external capacitance. The switched position for the switched path in the third chip 101C provides for no capacitance to be directed to the voltage using device in the third chip 101C.

In the embodiment presented, the second chip 101B is an example of the third switched position for the switched path. The switched path provides for the capacitor capacitance of the chip 101B to be provided to both the voltage using device 110B on the second chip 101B and to the second electronic entity. As shown the capacitance of C2 is directed to the voltage using device on the second chip 101B by the switched position of the switched path. The capacitance of both C1 of the second chip 101B is directed to the external path 105B. This may allow the capacitance of third chip 101B to be shared between the voltage using device 110B on the second chip 101B and with a second electronic entity. In this example, as with the third chip 101C, the second electronic entity would be first chip 101A. This is because the same explanation discussed for third chip 101C.

In the embodiment presented, the first chip 101A is an example of a second electronic entity that is provided capacitance by the first electronic entity. The first chip 101A ends up becoming the second electronic entity due to the switched position for the switched path on it and the other chips 101B-C. If one of the other chips 101B-101D had their switched position changed to their switched path the first chip 101A may go from to the second electronic entity to a first electronic entity. The embodiment illustrates the variation in the switched paths and the first and second electronic entities may have. It also illustrates how the number of first and second electronic entities may vary between embodiments. In various embodiments the number of electronic entities and the elements on each may vary in number, type, and location. The embodiment presented is meant to be illustrative only and not to be considered limiting.

While FIG. 1B depicts a high-level block diagram of an exemplary group of electronic entities in which the entities are chips 101A-101D, different types entities may be used in alternative embodiments. For example, the entities may be dies or wafers. In addition, while FIG. 1B depicts the group of electronic entities arranged horizontally, the entities may be arranged vertically in alternative embodiments. For example, a variety of technologies provide electrical connectivity between stacked, multiple active device planes. These technologies integrate various 2D structures into a 3D package. There are several techniques for implementing 3D integration. In 3D packaging, multiple chips or dies are stacked and wire bonded in a single 3D package. In monolithic wafer-level 3D technology, wafers are aligned and bonded. The monolithic wafer-level 3D technology uses through-silicon-vias (TSVs) to interconnect the multiple dies. One example of 3D technology is 3D DRAM. Another example is a 3D DRAM and a 3D multicore system integrated into a single package.

In an embodiment, the entities 101A-101D are sets or ranks of DRAMs arranged in a vertical stack within a 3D package and the connecting path 130 is a TSV or a wire in which each rank is connected to the same select signal, e.g., the same chip select signal.

Figure 2:
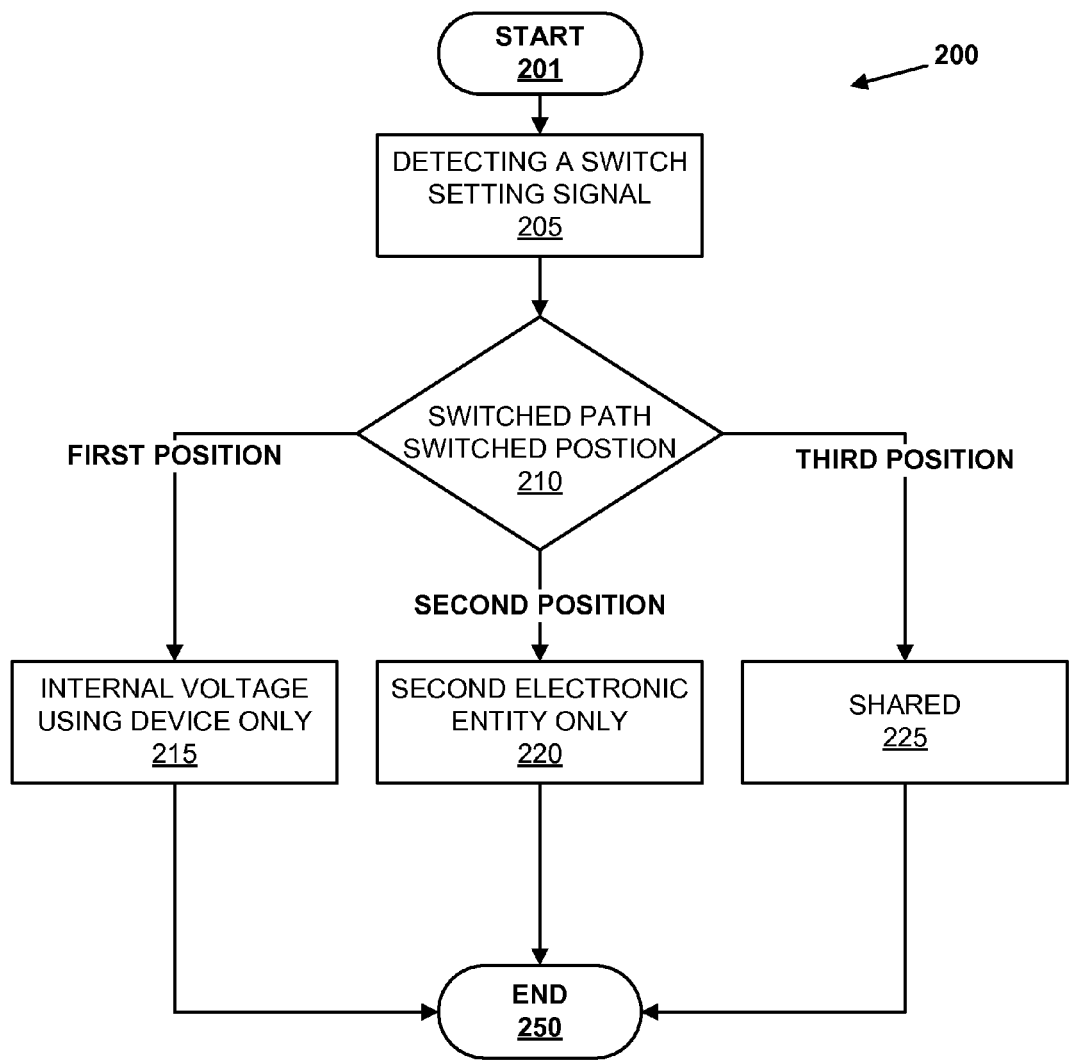
FIG. 2 is a flowchart illustrating a method for sharing capacitance, according to an embodiment of the invention.

FIG. 2 is a flowchart illustrating a method 200 for sharing capacitance, according to an embodiment of the invention. The method 200 may start at block 201. In block 205, a switch setting signal may be detected by an element or elements that set the switched position for the switched path on the first electronic entity. In block 210, the switched position for the switched path is determined and set resulting in one of at least three possible outcomes. If the switched path is set to the first switched position the method 200 may proceed to block 215. In block 215, the capacitance of the capacitor on the first electronic entity may be provided to the internal voltage using device only. The method may then end at block 250.

In the embodiment shown, if the switched path is set to the second switched position the method 200 may proceed to block 220. In block 220, the capacitance of the capacitor on the first electronic entity may be provided to the second electronic entity only. The method may then again end at block 250.

In the embodiment shown, if the switched path is set to the third switched position the method 200 may proceed to block 225. In block 225, the capacitance of the capacitor on the first electronic entity may be shared with both the voltage using device on the first electronic entity and with the second electronic entity. The method may then again end at block 250.

In various other embodiments, the signal sent to set the switched position of the switched path may be a single setting signal or a plurality of switch setting signals to one or more elements that may reposition switches on the switched path. Other embodiments may also have more numerous positions to be selected. These embodiments may vary in positions to be set due to number or type of voltage using electronic devices on the first electronic entity, the number or type of capacitors on the first electronic entity and the number or type of paths available on the first electronic entity. For example in the embodiment shown in FIG. 1A a switch setting signal may detected for all switches 111, 116A and 116B at once or individual switch setting signals may be detected for each switch 111, 116A, or 116B individually. As discussed previously, in various embodiments the selection of switch setting signals may change the electronic entity between a first and a second electronic entity depending on the other electronic entities it may be in communication with. For example, the first and second electronic entities may be first and second ranks of a DRAM. The switching setting signals may switch all or part of a pool of capacitance between the first and second ranks.

In various embodiments, the first electronic entity can contain a receiver for receiving instructions, or the switch setting signal, for the switched path. For example, switch logic inside the package may be employed to facilitate switched position of the switched path. In this example, if the chip is a memory chip a memory control, for example a chip select signal, can be used to program the switched position of the switched path through switch setting signals embedded in the mode register set (MRS) commands. The MRS decoder is the receiver for receiving switch setting signals for the switched path. The MRS decoder may have logic in it for decoding the instructions, e.g, a chip select signal, for the switched path and the ability to change the switched position based upon the received switch setting signal. In other embodiments, the receiver may be other currently used communication or control elements for or to the first electronic entity. Instructions for the switch position of the switched path may be embedded in the communications of these elements. In other embodiments, new communication or control hardware, such as a receiver, or software may be added to system and electronic entities In some embodiments, groups, or pools of capacitors and switched paths, may be controlled together. For example, some memory can have more than one rank, with the ranks generally not accessed at the same time. The sharing of capacitance between chips on the first row may be controlled with single command. In the example a command may change the switched position of the switched path in a group of chips in a first rank to go from being in a first position of using the capacitance internally to a second position of providing it to the second rank memory chips. In various embodiments, the changing of switched position may occur during system run time, based on the data access pertaining to any one of the chips, the control logic decodes the rank signals to control the switched position. Switched position and the resulting management of capacitance to the desired chip or chips may be based on the programmed pattern. This may, in some embodiments, be based of the chip array pool based on chip access While this disclosure has described the details of various embodiments shown in the drawings, these details are not intended to limit the scope of the invention as claimed in the appended claims.

What is claimed is:

1. A system for sharing capacitance, comprising: a first electronic entity with a capacitor having capacitance; and a switched path in the first electronic entity, wherein in a first switched position the switched path provides the capacitance to a voltage using device in said first electronic entity, in a second switched position the switched path provides the capacitance to a second electronic entity, and in a third switched position the switched path provides the capacitance to both the voltage-using device in the first electronic entity and the second electronic entity.

2. The system of claim 1, wherein the first electronic entity is a chip.

3. The system of claim 1, wherein the voltage using device is a memory.

4. The system of claim 1, wherein the voltage using device is a CPU core.

5. The system of claim 1, wherein the second electronic entity is a chip.

6. The system of claim 1, further comprising: the first electronic entity containing a receiver for receiving a switch setting signal for the switched path.

7. The system of claim 6, wherein the receiver is a Mode Register Set (MRS) decoder.

8. A method for sharing capacitance, comprising: detecting switch setting signal at first electronic entity with a capacitor; and switching a switched path in the first electronic entity to a specified switched position based upon the switch setting signal, wherein in a first switched position the switched path provides capacitance to a voltage using device in the first electronic entity, in a second switched position the switched path provides capacitance to a second electronic entity, and in a third switched position the switched path provides capacitance to both the voltage using device in the first electronic entity and the second electronic entity.

9. The method of claim 8, wherein the first electronic entity is a chip.

10. The method of claim 8, wherein the voltage using device is a memory.

11. The method of claim 8, wherein the voltage using device is a CPU core.

12. The method of claim 8, wherein the second electronic entity is a chip.

13. The method of claim 8, wherein the switch setting signal is embedded in a Mode Register Set (MRS) command.

\* \* \* \* \*